(12) United States Patent
Westergaard Andersen

(10) Patent No.: US 9,776,800 B2
(45) Date of Patent: Oct. 3, 2017

(54) MODULAR CONVEYOR AND PROCEDURE FOR ASSEMBLING A MODULAR CONVEYOR

(71) Applicant: AMMERAAL BELTECH MODULAR A/S, Vejle Ost (DK)

(72) Inventor: Kenneth Westergaard Andersen, Vejle Ost (DK)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 0 days.

(21) Appl. No.: 14/905,932

(22) PCT Filed: Jul. 11, 2014

(86) PCT No.: PCT/DK2014/050217
§ 371 (c)(1),
(2) Date: Jan. 18, 2016

(87) PCT Pub. No.: WO2015/007289
PCT Pub. Date: Jan. 22, 2015

(65) Prior Publication Data
US 2016/0167885 A1 Jun. 16, 2016

(30) Foreign Application Priority Data
Jul. 19, 2013 (GB) .................................. 1312910.1

(51) Int. Cl.
*B65G 21/06* (2006.01)
*B65G 21/10* (2006.01)
*B65G 17/08* (2006.01)

(52) U.S. Cl.
CPC ............. *B65G 21/06* (2013.01); *B65G 17/08* (2013.01); *B65G 2207/30* (2013.01)

(58) Field of Classification Search
CPC .................................. B65G 21/06; B65G 21/10
(Continued)

(56) References Cited

U.S. PATENT DOCUMENTS 3,605,994 A * 9/1971 Parlette .................. B65G 21/06
198/836.1
4,144,965 A * 3/1979 Alldredge .............. B65G 21/22
198/838
(Continued)

FOREIGN PATENT DOCUMENTS

| CN | 102951413 | 3/2013 |
|---|---|---|
| DE | 202008009151 | 7/2008 |
| EP | 0 492 058 A1 | 7/1992 |

OTHER PUBLICATIONS

International Search Report prepared by the European Patent Office on Oct. 17, 2014, for International Application No. PCT/DK2014/050217.
(Continued)

*Primary Examiner* — Douglas Hess
(74) *Attorney, Agent, or Firm* — Brent P. Johnson; Berg Hill Greenleaf Ruscitti, LLP

(57) ABSTRACT

A modular conveyor is assembled from a kit of standard components, said conveyor having a length, width and height, and wherein the conveyor comprises: (a) four end side plates each having an aperture suitable to accommodate a sprocket wheel axle; (b) two sprocket wheel axles wherein at least one axle is suitable to be connected to a drive means, wherein each axle may accommodate one or more sprocket wheels; (c) web elements attachable to one side of the side plates in order to keep pairs of side plates at a determined lateral distance, wherein said web elements further comprise means for supporting an endless conveyor belt; and (d) an endless conveyor belt arranged around the sprocket wheels.

12 Claims, 5 Drawing Sheets

(58) Field of Classification Search
USPC .... 198/836.4, 837, 841, 860.1, 861.1, 861.2
See application file for complete search history.

(56) References Cited

U.S. PATENT DOCUMENTS

| | | | | |
|---|---|---|---|---|
| 4,724,953 A * | 2/1988 | Winchester | ............ | B65G 45/10 198/836.3 |
| 4,926,009 A * | 5/1990 | Van Leeuwen | ...... | H05K 7/1449 174/135 |
| 4,930,621 A | 6/1990 | Brown | | |
| 5,762,178 A * | 6/1998 | Tarlton | .................. | B65G 21/06 198/860.2 |
| 5,988,362 A * | 11/1999 | Nakamura | ............ | B65G 15/00 198/816 |
| 6,053,307 A * | 4/2000 | Honda | .................. | B65G 15/46 198/839 |
| 6,427,831 B1 * | 8/2002 | Norton | .................. | B65G 21/06 198/841 |
| 6,640,966 B2 * | 11/2003 | Reatti | ..................... | B65G 15/60 198/841 |
| 7,000,759 B1 * | 2/2006 | Jones | ..................... | B65G 15/62 198/615 |
| 7,562,766 B2 * | 7/2009 | Call | ....................... | B65G 15/62 198/840 |
| 7,604,113 B2 * | 10/2009 | Pluszynski | ............. | B65G 23/06 198/834 |
| 7,946,415 B2 * | 5/2011 | DeGennaro, Jr. | ...... | B65G 15/62 198/617 |
| 8,186,503 B1 * | 5/2012 | Burchell | ............ | B65G 21/2072 198/836.3 |
| 8,925,718 B2 * | 1/2015 | Miles | ..................... | B65G 21/06 198/860.1 |
| 9,394,111 B2 * | 7/2016 | Caris | ..................... | B65G 15/62 |
| 2007/0029171 A1 | 2/2007 | Nemedi | | |

OTHER PUBLICATIONS

International Preliminary Report on Patentability for International (PCT) Patent Application No. PCT/DK2014/050217, mailed Jan. 28, 2016, 8 pages.

* cited by examiner

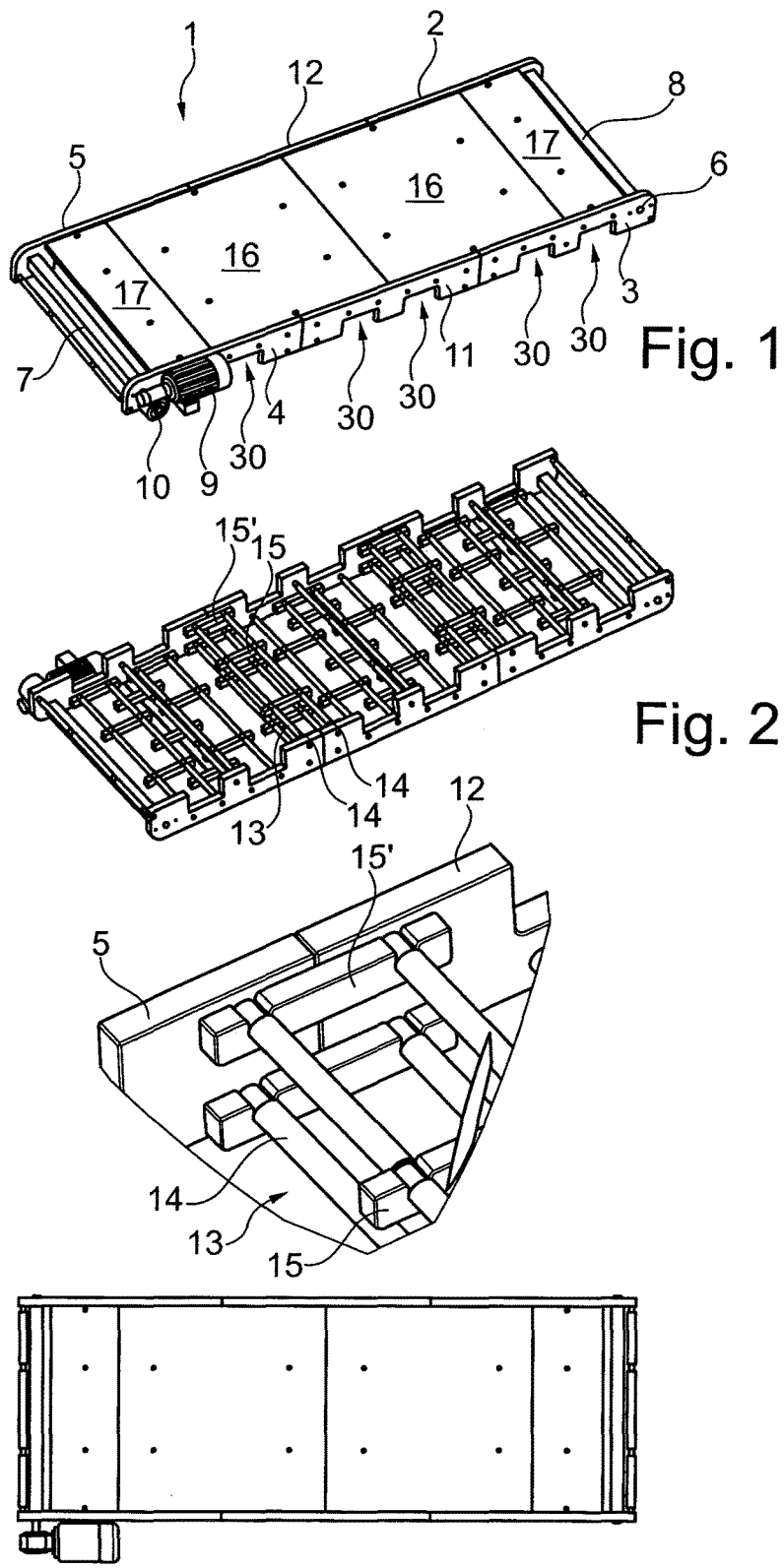

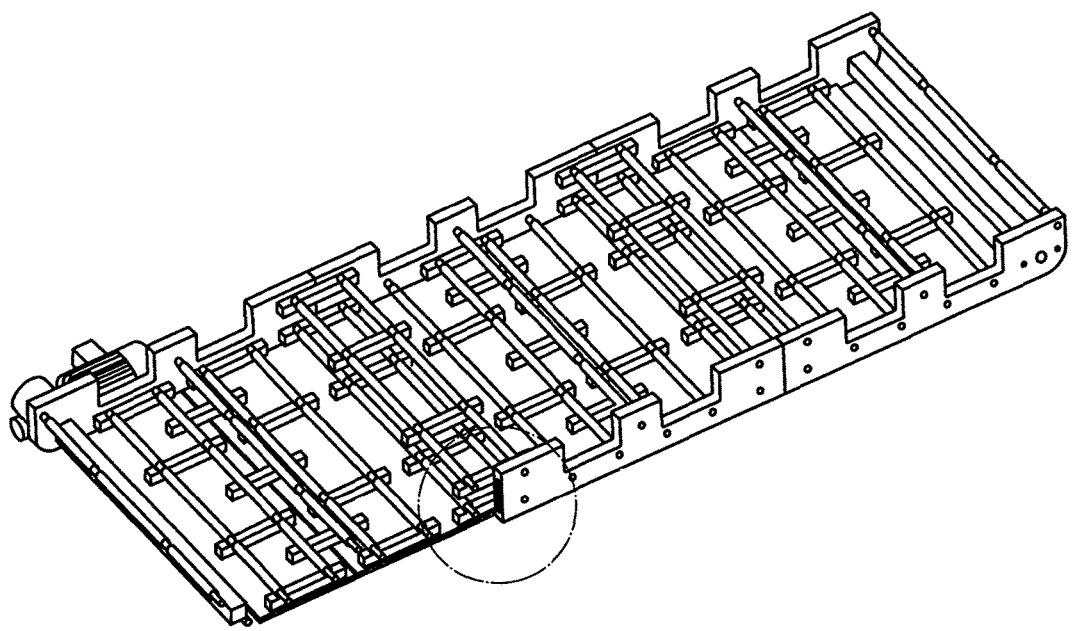
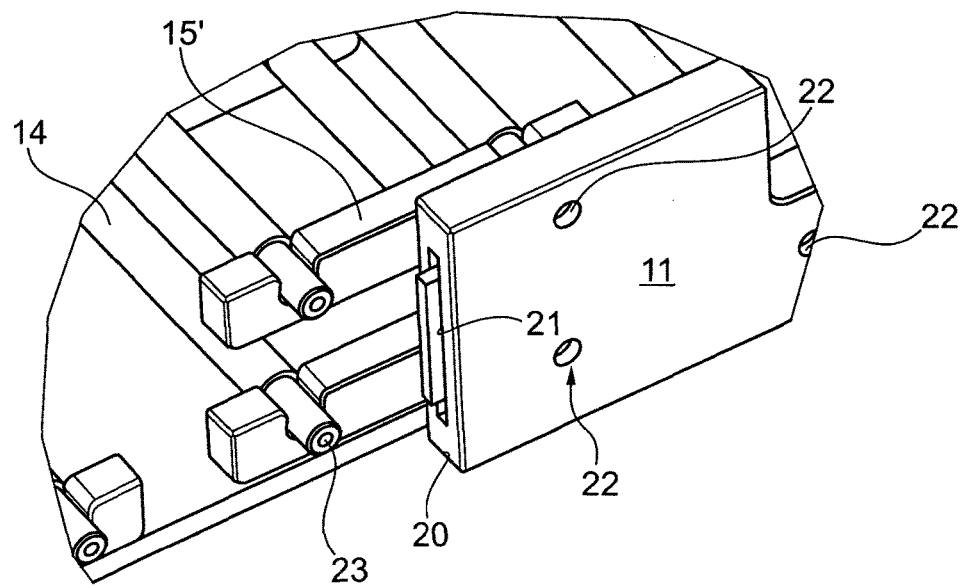
Fig. 4

MODULAR CONVEYOR AND PROCEDURE FOR ASSEMBLING A MODULAR CONVEYOR

CROSS REFERENCE TO RELATED APPLICATIONS

This application is a national stage application under 35 U.S.C. 371 and claims the benefit of PCT Application No. PCT/DK2014/050217 having an international filing date of 11 Jul. 2014, which designated the United States, which PCT application claimed the benefit of Great Britain Patent Application No. 1312910.1 filed 19 Jul. 2013, the disclosures of each of which are incorporated herein by reference.

FIELD OF THE INVENTION

The present invention relates to a modular conveyor being assembled from a kit of standard components.

BACKGROUND OF THE INVENTION

In the art of conveying articles from A to B there are a plurality of solutions both with respect to the conveying structure and the conveyor belts used in order to address the issue of moving various objects from A to B. Common for all these installations is the fact that they are often purpose-built and comprise a very rigid stainless steel structure on which the conveyor belt is arranged.

For a number of purposes these prior art structures have a number of drawbacks in that it is very cumbersome and difficult to change the path of an existing conveyor structure in that the conveying structure originally was built and constructed for a certain conveying path and as such the stainless steel structure which has been welded together require substantial alterations in order to be able to change the path. For these purposes an existing conveyor structure is often scrapped and replaced by a new conveying structure having the desired path.

DE 202008009151 U1 discloses a versatile conveyor structure based on two parallel side beams. The side beams are provided with evenly spaced apertures (modular), such that it is possible to mount conveyor equipment such as drive pulleys, sprocket wheels/axles, conveyor belt support, belt tensioning means etc. As all equipment is suitable to be mounted on the side beams, it is relatively easy to assemble and disassemble the conveyor, replace broken or worn devices, service, and overall a relatively versatile conveyor system is provided.

As the conveyor system is bound by the two parallel mirror image side beams, alteration of the conveyor structure may require new longer side beams, or that the side beams be shortened. Only the side beams needs to be modified as all other devices are modular and are mountable in the apertures provided in the side beams.

Also for temporary purposes where it is desirable for a shorter or longer period of time to be able to use a conveyor for a specific task the known devices are quite expensive and not very versatile.

OBJECT OF THE INVENTION

Consequently, it is an object of the present invention to provide a modular conveyor structure which is both portable and may easily be adapted to the job at hand, i.e. to the conveying path which is desired and may easily be altered to address substantially any conveying needs without major alterations.

DESCRIPTION OF THE INVENTION

The invention addresses this by providing a modular conveyor being assembled from a kit of standard components, said conveyor having a length, width and height, where the conveyor at least comprises:
a. four end side plates, where each end side plate is provided with an aperture which aperture is suitable to accommodate a sprocket wheel axle;
b. two sprocket wheel axles, where at least one axle is suitable to be connected to drive means, where each axle may accommodate one or more sprocket wheels;
c. web elements, which elements are attachable to one side of the end side plates, in order to keep pairs of side plates at a determined lateral distance, where said web elements further comprises means for supporting an endless conveyor belt;
d. an endless conveyor belt arranged around the sprocket wheels.

The conveyor structure according to the invention comprises the bare minimum such that the four end side plates will be placed one in each corner of the conveyor structure. The invention foresees that an adequate foundation will be provided such that the modular conveyor will be placed on an adequate surface capable of taking the loads and stresses which the conveyor structure as such will be exposed to. Typically a factory concrete floor or the like will be sufficient.

The end plates are provided with apertures such that a sprocket wheel axle and optionally sprocket wheels may be arranged in the end plates. The sprocket wheel axles as such may be used to propel the conveyor belt depending on the interface between the conveyor belt and the sprocket wheel axle. In other instances sprocket wheels may advantageously be arranged on the sprocket wheel axle in a normal manner. For these purposes the sprocket wheel axle will typically have a non-round cross-section, typically square, such that easy transfer of power from the axle to the sprocket wheels may be achieved.

Between the end side plates, web elements are arranged where the web elements are attached to the inner sides of the end side plates. The width distance of the web elements is chosen in accordance with the desired width of the conveyor and as such by having standard width web elements corresponding to standard width conveyor belts it is easy to select corresponding conveyor belts and web elements and in this manner easily build a conveyor structure having the right dimensions. In this connection the sprocket wheel axle will naturally also be chosen having an appropriate length.

The web elements will in addition to maintaining the end side plates in a fixed width distance relationship also provide support for the endless conveyor belt both with respect to the upper conveying surface, i.e. the product transporting surface, as well as the return run of the conveyor belt.

In comparison to the prior art, for example as disclosed in DE 202008009151 U1, the present invention provides a fully modular system, making it possible to assemble the desired conveyor in desired length steps and width steps. It is foreseen that all components for the modular conveyor are kept in stock and assembled according to the specific task at hand. After use the conveyor may be disassembled and returned to stock, ready for next application. Consequently by assembling the desired number of side plates the length of the conveyor may be determined. Likewise, by selecting the axles and web elements the desired width may be selected independent of the length. Although the exact desired length and width may not be obtained due to the standardization of the system, it is possible to assemble a conveyor which always will almost fit. On the other hand as all components are in stock, and the assembly of the various components is rather easy, it is possible to assemble the desired conveyor very quickly.

Likewise if a component should fail, replacement is very easy, and spare parts are always immediately available, and will fit into the system as all components are standardized.

In a further advantageous embodiment of the invention side plates are provided, said side plates being connectable in either end to further side plates or an end side plate. These side plates are easily insertable between end plates in each side of the conveyor in order to extend the length of the conveyor at any desired multiple of side plates. In this manner the shortest conveyor may have a length corresponding to the length of two end side plates, the next step up in length will be two end side plates plus one side plate, and the next step up will be two end side plates and two side plates etc. The side plates will have the same connection features to adjacent side plates or further side plates as the end side plates have between themselves. Furthermore, the web elements may be connected in the same manner to the side plates as to the end side plates and therefore one standard connection for web elements may be utilized.

In a still further advantageous embodiment of the invention pivot side plates are provided, where said pivot side plates are connectable to side plates and/or end side plates, where the pivot plates have means for allowing adjacent side plates or end side plates to be arranged at an inclination or declination relative to an adjacent end side plate or side plate, and optionally further means are provided in said pivot plates for guiding the endless conveyor belt through the change in elevation.

The pivot side plates facilitate that the conveyor may change inclination either up or down during its run from A to B. The pivot plates are provided in two versions. A first simple version is simply a link connecting two adjacent substantially separate conveyors such that the pivot side plates are provided with two apertures in a spaced relationship where the apertures have a size such that they may be fitted around the sprocket wheel axles on adjacent conveyors. In this manner the pivot side plates firmly connects to adjacent conveyors whereby a substantially continuous conveyor is provided which in fact consists of two interconnected separate modular conveyors according to the invention. These pivot plates are also used when desiring to build a long conveyor, whereby two or more separate conveyors having separate drive means may be connected to form a single long conveying path. Hereby is a user provided with added flexibility in that each conveyor may be made in any desired length only limited by the drive means ability to propel objects on the conveyor belt, and when longer conveying paths are desired two or more conveyors are coupled together by means of the pivot plates as discussed above.

In another alternative version of the pivot side plates the pivot side plates are provided with conveyor belt guiding means such that although the continuing conveyor has an inclination and thereby the conveyor belt would tend to be pulled up, the conveyor belt guide means provided in the pivot side plates retain the conveyor belt in its path close to the underlying web elements. In this embodiment the pivot side plates may also be arranged around the sprocket wheel axles or may alternatively be attached to adjacent side plates in a spaced relationship allowing for the increased or decreased elevation of the continuing conveyor part.

In a further preferred embodiment elevation guide rails are provided where said rails has an I- or T-shape, where the top of the I or the T has an upper flange and a body extending substantially perpendicular from said flange, where the elevation guide rails are arranged in parallel pairs, such that the rails provide a slot between the upper flanges of the two rails, where said slot has a narrow opening upwards and a wider opening, between the bodies of two parallel rails, and where a hold down tab is provided in at least some of the modular belt links, where said hold down tab has a first section extending substantially perpendicular to the transport surface of the module, where said section may be accommodated in the slot between two rails, and where at a distal end of the section a flange is provided said flange extending perpendicularly from said section, and is accommodated between the bodies of two parallelly arranged rails.

These rails provide a very smooth run for the conveyor belt along the conveying path, even when the conveying path comprises inclines and declines. Due to the inventive and easily installed rails which co-operates with hold down tabs on at least some of the conveyor belt modules, an easy to install, service and maintain solution is provided. Furthermore the rails, as they preferably are snap fitted onto the conveying structure are easy to install, re-position and remove.

In a still further advantageous embodiment of the invention turn modules are provided, where said turn modules have a set turning radius and are provided with an inner curved side and an outer curved side having a predetermined distance between said inner and outer curved sides, and where web elements are arranged between said inner and outer sides, and where means are provided in said inner and outer sides for connecting to side plates or end side plates.

Especially where the conveyor belt is made up from a large number of substantially identical modular elements having side-flexing capabilities it may be desirable to alter the direction of the conveyor structure. This is accomplished by inserting one or more of the turn modules in the conveying belt's path thereby altering the course of the conveyor. Naturally, the standard turn modules may both facilitate turns in both directions, i.e. either right or left compared to the conveying direction. By connecting a plurality of turn elements a turn through more degrees may be accomplished. Typically, standard turn modules will facilitate a turn of approximately 15°, but it is clear that turn modules having any angular turn may be manufactured as standard items for the system.

The web elements will be provided as module elements in standard modular lengths such that it is quite easy to interfit the web elements, for example in the shape of plates in the structure in response to the number of side end blades or side blades of which the conveyor is made. Naturally, when the web elements are in the shape of plates it may also be desirable to have half or third length plates (relative to the length of the side elements and end side elements) in order to be able to assemble the web elements without having the assembly line of the web plates in the immediate vicinity of the assembly of two adjacent side plates or end side plates. In this manner the overall construction is made stronger.

When the web elements are made as plates they may advantageously be provided with apertures in order to reduce the weight and also in order to allow any debris which may arrive on the conveyor belt to percolate through the conveyor belt and the web elements. In further embodiments the web elements may be bars which are fitted into holders which holders at the same time may function as connection and reinforcement elements between adjacent side plates or end side plates. Furthermore, in the side plates and the end side plates in the positions where the bars are supposed to be fitted, holes may be arranged such that the bars may be tightly secured to the side plates by means of bolts or the like.

Also a combination of bars and plates may be used in order to provide both the stability of the entire modular conveyor and the support for the conveying belt depending on the use of the conveyor.

In a still further advantageous embodiment the apertures provided in the end side plates are oblong, allowing the sprocket wheel axle to move in the plane of the conveyor belt, and where adjustment and tightening means are provided interacting between said sprocket wheel axles and said end side plates. In this manner it becomes possible firstly to adjust the tension in the belt as it is fitted, but also to readjust the tension as the belt wears and tends to extend a little bit.

A drive motor may be attached to the sprocket wheel axle where the motor provides propulsion means. As the axles are also standardly provided, the connection to the drive means and the shape of the motor may also be standardized such that different size motors may be selected depending on the length of the conveyor where the interface with the axle is the same for all motors. It is therefore possible to easily select an appropriate motor size with respect to the length of the conveyor belt and the propulsive force which is needed or intended to be desired in order to propel the objects on the conveyor belt.

One of the overriding principles and one of the main aspects which certainly distinguishes the present invention from prior art conveyors is the fact that the entire conveyor structure may be assembled in a minimum of time with a minimum of tools and it may also be disassembled or the construction may be altered very easily. This is in part due to the invention which in a further embodiment provides that all plates and elements are assembled by snap fitting click mechanisms such that they may easily snap together and be held firmly in engagement without the use of any tools. Furthermore, as all elements are standard elements, it will be easy for untrained personnel to disassemble and assemble the conveyor correctly as there are so few elements making up the conveyor and it does not require special skills in order to snap fit the elements together whether the elements are side plate elements, end side plates, web elements etc.

The invention therefore also provides in a further advantageous embodiment of the invention a procedure for assembling a modular conveyor as described above comprising components as mentioned above wherein in a. Two end side plates are arranged at a distance corresponding to the width of the finished conveyor in either end of the conveyor, said side plates defining the ends of two opposing sides of the modular conveyor structure;

b. Optionally a plurality of pairs of side plates are arranged between the end plates in either side of the modular conveyor, each plate connected to an adjacent plate;

c. Optionally pivot plates are arranged in the opposing sides of the modular conveyor sides, and elevation means are arranged as support for the elevated side and end plates;

d. Sprocket wheel axles and optionally sprocket wheels are fitted in the end plates in either end of the conveyor;

e. Web elements are arranged along the length of the conveyor f. An endless conveyor belt is arranged between the sprocket wheel axles and/or wheels in either end of the conveyor, and the tension in the belt is optionally adjusted by the adjustment and tightening means;

g. Optionally a drive motor is fitted to one sprocket wheel axle.

Above the general concept of the invention has been explained, but with reference to the accompanying drawing further details of a preferred embodiment of the invention will be disclosed.

DESCRIPTION OF THE DRAWING

In the accompanying drawings

FIG. 1 illustrates schematically a modular conveyor according to the invention;

FIG. 2 illustrates web elements and the underside of the conveyor structure of FIG. 1;

FIG. 3 illustrates a detail of a connection between an end side plate 5 and a side plate 12 as well as the web elements 13;

FIG. 4 illustrates a detail where it may also be seen that the side plate 11 is provided with apertures;

DETAILED DESCRIPTION OF THE INVENTION

Figure 5:
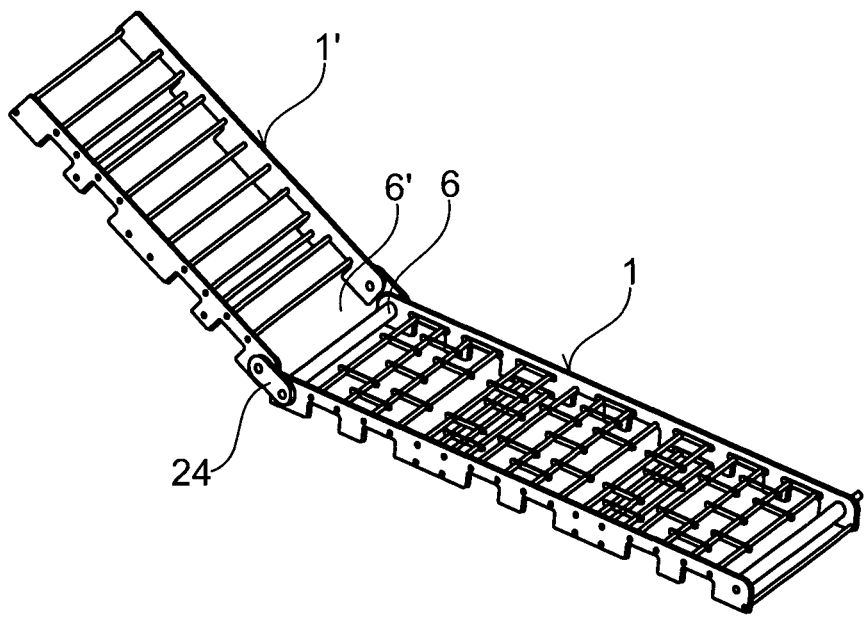
FIG. 5 illustrates two substantially separate conveyors connected by a pivot plate.

In FIG. 1 is schematically illustrated an embodiment of a modular conveyor according to the invention. The conveyor 1 is assembled from a kit of standard components where the components in the illustrated embodiment comprises four end side plates 2, 3, 4, 5 where each end side plate 2, 3, 4, 5 is provided with an aperture 6 (only visible on end side plate reference number 3). In the end side plates 2, 3, 4, 5 are arranged sprocket wheel axles 7, 8 fitted inside the apertures 6. The apertures and/or the axles may naturally be provided with ball bearings or friction reducing bushings, which is general knowledge and common, in such a manner that the skilled person will implement these without any undue burden. In the illustrated embodiment the axles 7, 8 are not provided with sprocket wheels, but naturally sprocket wheels may be arranged around the axles 7, 8. For this purpose the axles in this embodiment have a square cross-section such that it is relatively easy to transfer power from the axles through the sprocket wheel to the underside of the conveyor belt.

Furthermore, drive means in the shape of an electrical motor 9 are provided which by means of a gear box 10 transfers power to the axles 7.

In this embodiment two side plates 11, 12 are provided in order to provide the modular conveyor 1 with a desired length. Any number of side plates 11, 12 may be inserted between the end side plates 3, 4 according to the circumstances in order to design a modular conveyor having the desired length.

In order to retain the end side plates 2, 3, 4, 5 and the side plates 11, 12 in a spaced, lateral relationship web elements are attached to the end side plates and side plates in order to keep the determined lateral distance. In FIG. 2 the web elements 13 are more clearly illustrated. In this embodiment the web elements 13 comprise a plurality of bars 14 which are maintained in a relationship by holders 15. Special holders 15' are provided as illustrated in detail in FIG. 3.

The bars may be fitted with "little wheels" or shims, especially the bars 14 which in use are lowermost in order to reduce friction, wear and noise for the conveyor belts return run. In practice it may be shims made from a low friction material such as nylon or delarin, which has a central hole, so they may be fitted over the bars 14.

In the illustrated embodiment in FIG. 1 a number of plates 16 and half plates 17 are provided both as a support to the conveyor, but also as part of the web elements 13 giving the modular conveyor its rigidity and structure.

Common for both the sprocket wheel axle 7, 8 and the web elements 13 is the fact that the dimensions may be chosen such that they fit to the desired purpose, i.e. for conveyor belts having a narrow width, smaller plates and web elements and axles may be selected and for larger widths wider plates, web elements and axles will be chosen.

The conveyor belt as such is not illustrated for clarity reasons, but it is clear to the skilled person that any type of conveyor belt, both conveyor belts built up of a plurality of modular belt links, interconnected for example by pivot pins or continuous web type conveyor belts may be applied to the modular conveyor structure.

Turning to FIG. 3 a detail of a connection between an end side plate 5 and a side plate 12 as well as the web elements 13 is illustrated. The bars 14 are received and held by the holders 15, 15'. The holder 15' is special in that it is attachable to the inner side of the end side plate 5 and the side plate 12 such that a firm and rigid connection is established between these two elements. The connection between adjacent elements be it inside plates 2, 3, 4, 5 or side plates 11, 12 is normally carried out as illustrated with reference to FIG. 4 wherein and end face 20 of either a side plate or an end side plate is illustrated. The end face 20 is provided with a quick connection 21 such that two adjacent side plates or end side plates and side plates may be quickly connected.

Furthermore, from the detail illustrated in FIG. 4 it may also be seen that the side plate 11 is provided with apertures 22. In the special embodiment where the apertures 22 are provided the bars 14 are provided with threaded holes in distal ends of the bars 14 such that a bolt (not illustrated) may be inserted through the aperture 22 and screwed into a thread provided in the holes 23 in the bars 14. In this manner the modular conveyor may be held together by a simple bolt connection and quick connections as discussed above with reference to the quick connector 21.

A further feature of the invention is provided by the openings 30 which are provided in the side plates and end side plates in order for a normal forklift to be able to lift either single elements or the entire conveyor. Especially in embodiments of the invention where relatively short modular conveyors are constructed and where the modular conveyor components, i.e. both side plates, end side plates, plates and bars are made from a plastic material whereby the conveyor is very light, the entire conveyor may be lifted simply by inserting the forks of a forklift in the appropriate openings 30 provided in the modular conveyor.

Figure 6:
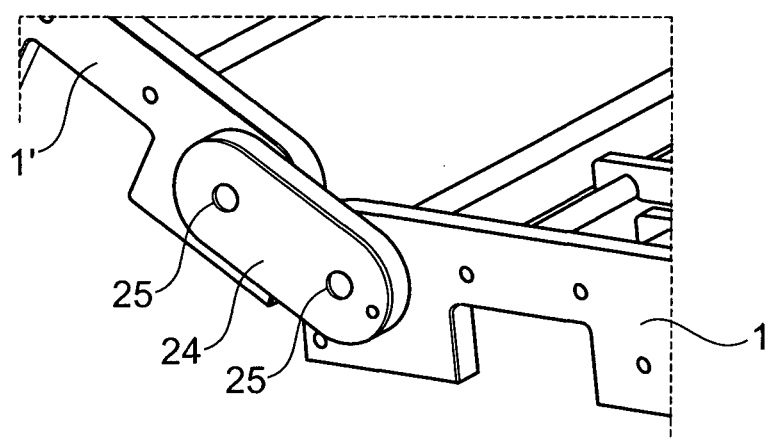
FIG. 6 illustrates a detail of the pivot plate attachment.

In order to allow the modular conveyor to have an inclination or a declination, pivot plates and side plates 24 are provided. In FIG. 5 two substantially separate conveyors 1, 1' are connected by inserting pivot plates 24 over the sprocket wheel axles 6, 6' of adjacent ends of the conveyors 1, 1'. In this manner it is possible to pivot one conveyor 1' with relation to another section of the conveyor 1. The pivot plates are further illustrated with reference to FIG. 6 from which it is clear that apertures 15 are provided in a pivot plate 24 such that the pivot plate 24 may be fitted around adjacent sprocket wheel axles on two adjacent modular conveyors 1, 1' thereby maintaining a fixed distance between the adjacent conveyors 1, 1' and at the same time allowing one of the conveyors to be out of the plane of the other conveyor.

In this connection it should also be noted that the pivot plates 24 may also be used in order to extend the length of the conveying surface defined by the upper surface of the conveying belt by coupling 2, 3 or more modular conveyors together thereby constructing a relatively long conveying surface.

Figure 7:
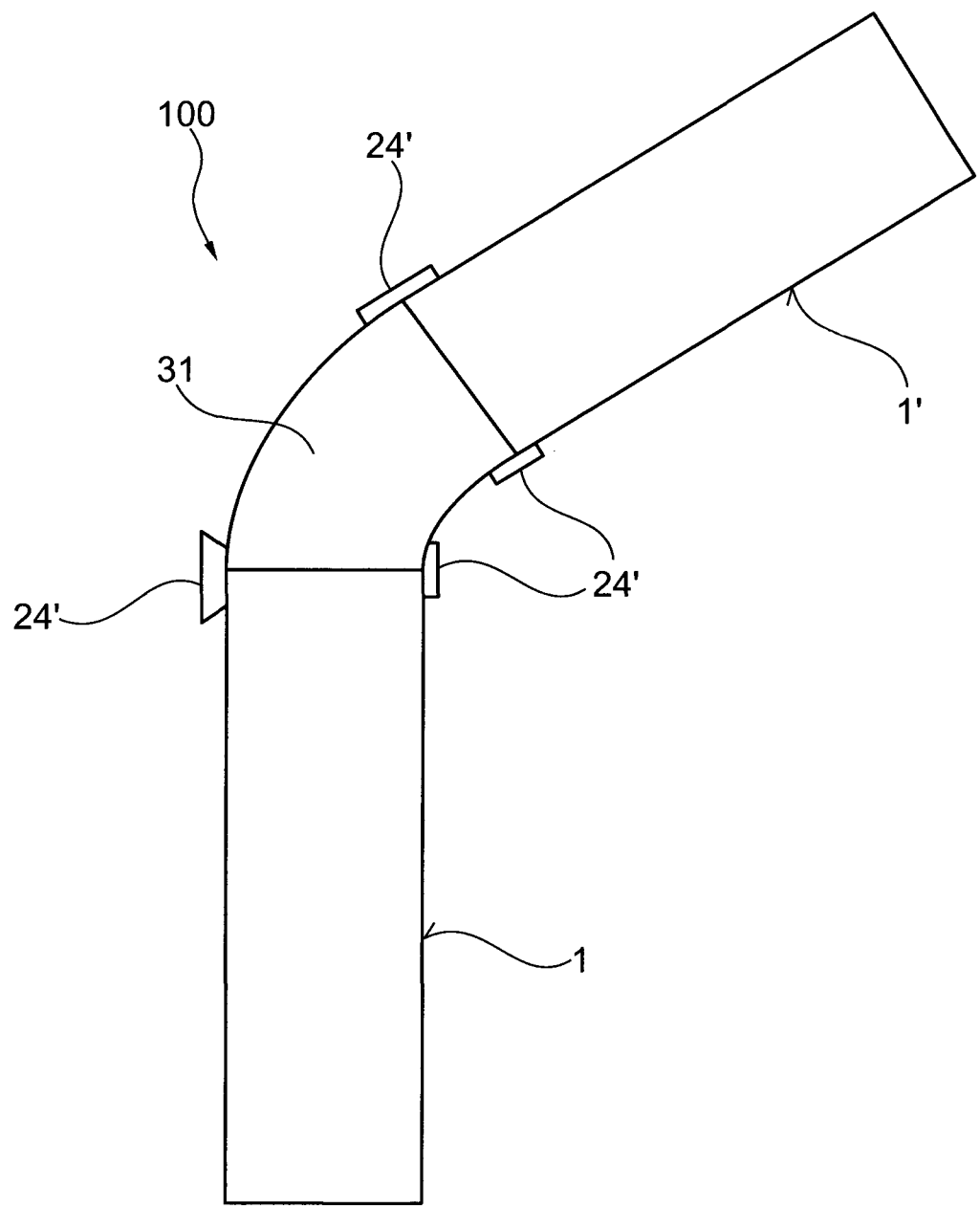
FIG. 7 schematically illustrates a conveyor including a turn module.

In FIG. 7 is illustrated a conveyor 100 made from two separate modular conveyors 1,1' connected via a turn module 31. The turn module 31 provides a turning radius through a determined arc, for example 15, 20 or 30 degrees. The turn module 31 is coupled to adjacent ends of the adjacent conveyors 1, 1' by elements 24' similar to the pivot plates 24 and in the same manner.

The turn module 31 is available in two configurations (in addition to various width configurations). In a first configuration the turn module 31 is in itself a small conveyor, meaning that there are sprocket wheel axles, web elements etc provided, as well as a separate conveyor belt, drive means etc. The advantages of this configuration is that the straight conveyors may have any type of conveyor belt, and may be used in other combinations also, whereas only the turn module 31 needs having a conveyor belt of the side-flexing type, such as Flex SNB available from Ammeraal Beltech. For a user it is therefore advantageous in that the standard straight conveyors may be used for any application with or without turn modules, and only few turn modules needs to be in stock providing the possibility of creating varying conveying paths.

In a second configuration, the turn modules side plates 11',12', are provided with means for guiding a conveyor belt through the turn. In this configuration the conveying structure is made or assembled from the same elements as mentioned above, but one common conveyor belt is arranged in the conveying path.

It is also foreseen that more turn modules 31, traversing the same arc or different arcs, may be implemented in the same turn to provide a turn through more degrees, or in the same conveying path, to adapt the conveying path to the local conditions.

The turn modules are provided with specialised web elements (not illustrated).

Figure 8:
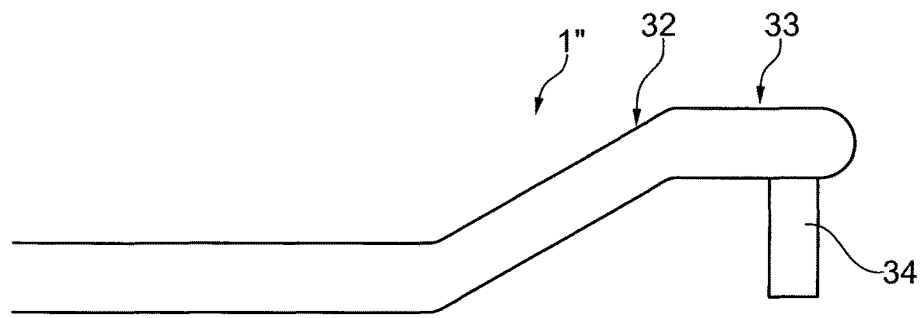
FIG. 8 schematically illustrates a side-view of a conveyor having an inclined section FIG. 9 schematically illustrates a plane view of the conveyor of FIG. 8

In FIG. 8 is schematically illustrated a side-view of a conveyor structure" provided with an inclination 32. The upper section 33 of the conveyor is supported by suitable supports 34.

In order to hold down the conveyor belt (not illustrated) elevation guide rails 40,41,42,43 are provided. The guide rails 40,41,42,43 are arranged in parallel pairs, at least over the part of the conveyors travelling path where it is desireable to hold down the conveyor belt.

Figure 9:
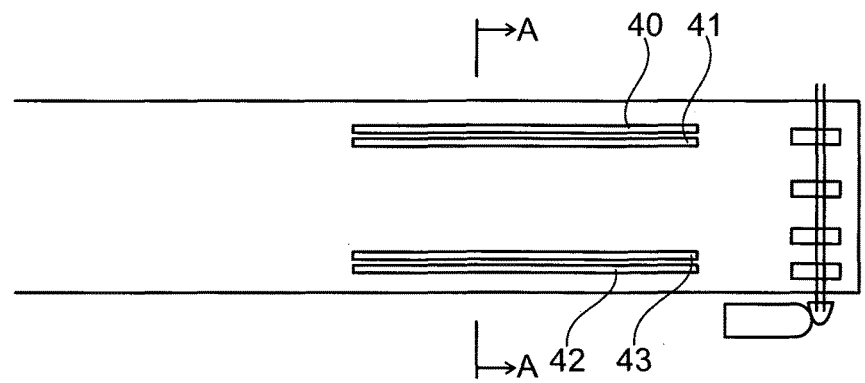
Figure 10:
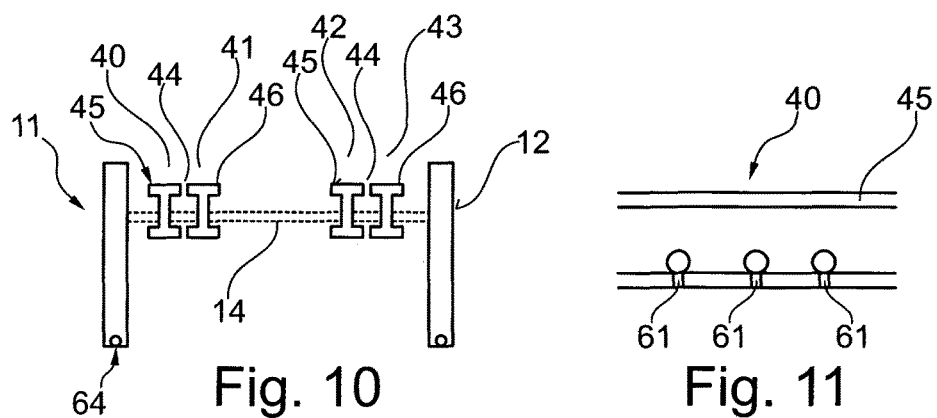
FIG. 10 schematically illustrates a cross-section through a conveyor as illustrated in FIGS. 8 and 9.

In FIG. 10 is illustrated a cross-section through the conveyor illustrated in FIG. 9 at the indicated A:A. The conveyor's side plates 11, 12 are similar to those discussed above. The elevation guide rails 40,41,42,43, in this embodiment having a cross-section similar to an "I" are arranged in pairs 40,41 and 42,43, such that the slot 44 between the flanges 45,46 of the rails is narrower than the distance between the bodies of the rails. At least some of the modules from which the conveyor belt is assembled is provided with hold down tabs 50, as illustrated in FIG. 13.

Figure 13:
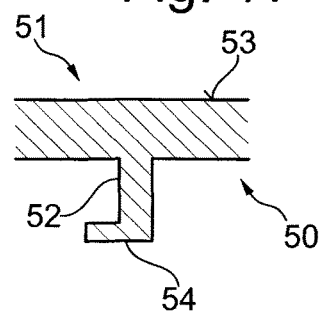
FIG. 13 illustrates a detail of embodiments where the modules are provided with hold down tabs.

FIG. 13 illustrates a section through part of a belt module 51 provided with a hold down tab 50. The hold down tab 50 has a first section 52 extending substantially perpendicular to the transport surface 53 of the module 51, where said section 52 may be accommodated in the slot 44 (see FIG. 10) between two rails 40,41,42,43, and where at a distal end of the section 52 a flange 54 is provided, said flange 54 extending perpendicularly from said section 52. The flange 54 is accommodated between the bodies of two parallelly arranged rails 40, 41, 42, 43. In this manner the flange 54 assures that the module 51 cannot be pulled away from the structure, and the section maintains the modules in the correct position relative to the sides 11, 12. Needless to say the guide rails shall be mounted at appropriate lateral distances, allowing the hold down tabs to travel in the slots.

Figure 11:
FIG. 11 illustrates fastening details of the rails.

The guide rails 40, 41, 42, 43 may be fastened to the structure in any suitable manner. In the example illustrated in FIGS. 10 and 11 the rails are provided with a number of keyhole lateral apertures 61. The apertures are dimensioned such that the rails may be squeezed over the bars 14 (see FIG. 2), and held in place.

Although the rails 40, 41, 42, 43 are illustrated as having an I-shaped cross-section, T-shaped rails are also preferred.

Figure 12:
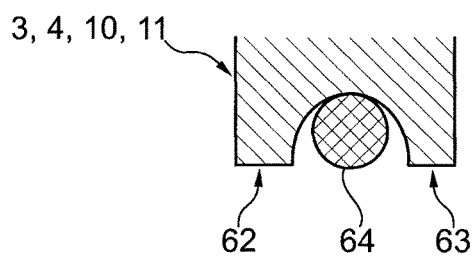
FIG. 12 illustrates a detail of the bottom side of the end and side plates.

Turning to FIG. 12 a detail of the underside of an end or side plate is illustrated. In the lowermost surface 62, is formed a groove 63. In the groove 63 is fitted a rod or wire 64. The wire 64 extends over the entire length of the conveyor and serves to tighten the modules together. Consequently by fitting the wire in the groove and thereafter tensioning the wire, all the side and end modules are maintained in closed and locked relationship.

The invention has now been explained with reference to a few preferred embodiments, but it is clear that the scope of protection shall only be limited by the appended claims.

What is claimed is:

1. Modular conveyor being assembled from a kit of standard components, said conveyor having a length, width and height, where the conveyor at least comprises:
 a. four end side plates, where each end side plate is provided with an aperture which aperture is suitable to accommodate a sprocket wheel axle, and where an end side plate is arranged in each corner of the conveyor;
 b. two sprocket wheel axles, each axle having two ends suitable to be accommodated in the apertures provided in the two end side plates arranged in each end of the conveyor, where at least one axle is suitable to be connected to drive means, where each axle accommodates one or more sprocket wheels;
 c. separate web elements that are attachable to an inner side of the side plates arranged on opposite sides of the conveyor, in order to keep pairs of side plates at a determined lateral distance, where said web elements further comprises means for supporting an endless conveyor belt;
 d. an endless conveyor belt arranged around the sprocket wheels and supported by the separate web elements along the conveyor belts upper run.

2. Modular conveyor according to claim 1, wherein side plates are provided, said side plates being connectable in either end to further side plates or an end side plate.

3. Modular conveyor according to claim 1, wherein pivot side plates are provided, where said pivot side plates are connectable to side plates and/or end side plates, where the pivot plates have means for allowing adjacent side plates or end side plates to be arranged at an inclination or declination relative to an adjacent end side plate or side plate, and optionally further means are provided in said pivot plates for guiding the endless conveyor belt through the change in elevation.

4. Modular conveyor according to claim 1, wherein one or more turn modules are provided, where said turn modules have a set turning radius and are provided with an inner curved side and an outer curved side having a predetermined distance between said inner and outer curved sides, such that ends of the inner and outer curved sides are attachable either to further turn modules or to side plates or end side plates, and where web elements are arranged between said inner and outer sides, and where means are provided in said inner and outer sides for connecting to side plates or end side plates.

5. Modular conveyor according to claim 1, wherein said web elements are provided as modular elements in standard modular lengths.

6. Modular conveyor according to claim 1, wherein the endless conveyor belt is assembled from a plurality of substantially identical modular belt links, wherein side plates are provided, said side plates being connectable in either end to further side plates or an end side plate, and further wherein pivot side plates are provided, where said pivot side plates are connectable to side plates and/or end side plates, where the pivot plates have means for allowing adjacent side plates or end side plates to be arranged at an inclination or declination relative to an adjacent end side plate or side plate, and optionally further means are provided in said pivot plates for guiding the endless conveyor belt through the change in elevation and further wherein one or more turn modules are provided, where said turn modules have a set turning radius and are provided with an inner curved side and an outer curved side having a predetermined distance between said inner and outer curved sides, such that ends of the inner and outer curved sides are attachable either to further turn modules or to side plates or end side plates, and where web elements are arranged between said inner and outer sides, and where means are provided in said inner and outer sides for connecting to side plates or end side plates and where the end side plates, the side plates, the pivot plates and the turn modules are designed in modular dimensions allowing the modular belt links to be assembled around the sprocket wheels in a fixed number of modules.

7. Modular conveyor according to claim 6, wherein elevation guide rails are provided where said rails have an I- or T-shape, where the top of the I or the T has an upper flange and a body extending substantially perpendicular from said flange, where the elevation guide rails are arranged in parallel pairs, such that the rails provide a slot between the upper flanges of the two rails, where said slot has a narrow opening upwards and a wider opening, between the bodies of two parallel rails, and where a hold down tab is provided in at least some of the modular belt links, where said hold down tab has a first section extending substantially perpendicular to the transport surface of the module, where said section may be accommodated in the slot between two rails, and where at a distal end of the section a flange is provided said flange extending perpendicularly from said section, and is accommodated between the bodies of two parallel arranged rails.

8. Modular conveyor according to claim 1, wherein the apertures provided in the end side plates are oblong, allowing the sprocket wheel axle to move in the plane of the conveyor belt, and where adjustment and tightening means are provided interacting between said sprocket wheel axles and said end side plates.

9. Modular conveyor according to claim 1, wherein at least one end side plate is provided with means for attaching the drive means in the form of a sprocket wheel axle drive motor, said motor providing propulsion means for the modular conveyor.

10. Modular conveyor according to claim 1, wherein the web elements are either:
 a. Plates, optionally provided with apertures having a length corresponding to the length of an end side plate, and a width corresponding to the desired width of the modular conveyor;
 b. Plates, optionally provided with apertures, where said plates either have a length corresponding to the length of one or more side plates or one or more side plates and the length of an end side plate, and a width corresponding to the desired width of the modular conveyor;
 c. Bars extending between side plates or end side plates, where said side plates or end side plates are arranged along opposite sides of the modular conveyor, where further a pair of bars are provided with a stabilizing element providing stiffness in the conveying plane.

11. Modular conveyor according to claim 1, wherein all plates and elements are assembled by snap fitting click mechanisms.

12. Procedure for assembling a modular conveyor comprising components from claim 1, wherein in
 a. Two end side plates are arranged at a distance corresponding to the width of the finished conveyor in either end of the conveyor, said side plates defining the ends of two opposing sides of the modular conveyor structure;
 b. Optionally a plurality of pairs of side plates are arranged between the end plates in either side of the modular conveyor, each plate connected to an adjacent plate;
 c. Optionally pivot plates are arranged in the opposing sides of the modular conveyor sides, and elevation means are arranged as support for the elevated side and end plates;
 d. Sprocket wheel axles and optionally sprocket wheels are fitted in the end plates in either end of the conveyor;
 e. Web elements are arranged along the length of the conveyor
 f. An endless conveyor belt is arranged between the sprocket wheel axles and/or wheels in either end of the conveyor, and the tension in the belt is optionally adjusted by adjustment and tightening means;
 g. Optionally a drive motor is fitted to one sprocket wheel axle.

* * * * *